United States Patent [19]

Bauer

[11] 4,244,230

[45] * Jan. 13, 1981

[54] FLUIDIC OSCILLATOR FLOWMETER

[76] Inventor: Peter Bauer, 13921 Esworthy Rd., Germantown, Md. 20767

[*] Notice: The portion of the term of this patent subsequent to Jan. 22, 1997, has been disclaimed.

[21] Appl. No.: 950,929

[22] Filed: Oct. 12, 1978

Related U.S. Application Data

[63] Continuation-in-part of Ser. No. 859,145, Dec. 9, 1977, Pat. No. 4,184,636.

[51] Int. Cl.³ .............................................. G01F 1/00
[52] U.S. Cl. ................................................. 73/861.19
[58] Field of Search ........................ 73/194 B, 194 C; 137/803, 804, 839, 841, 842

[56] References Cited

U.S. PATENT DOCUMENTS

| | | | |
|---|---|---|---|
| 3,500,849 | 3/1970 | McLeod, Jr. ......................... | 73/194 |
| 3,640,133 | 2/1972 | Adams .................................... | 73/194 |
| 3,690,171 | 9/1972 | Tippetts et al. ........................ | 73/194 |
| 3,885,434 | 5/1975 | Williamson ............................. | 73/194 |
| 4,085,615 | 4/1978 | Haefner ................................... | 73/194 |
| 4,184,636 | 1/1980 | Bauer ..................................... | 239/590 |

Primary Examiner—Herbert Goldstein
Attorney, Agent, or Firm—Ira C. Edell

[57] ABSTRACT

A fluidic oscillator flowmeter employs a fluidic oscillator wherein the frequency is proportional to flow through the oscillator. The oscillating flow is divided into two discrete paths, facilitating the counting of the frequency and the transduction of the frequency into a flow measurement indication. In one embodiment the flowmeter may be inserted into a large flow stream, wherein it utilizes only a small portion of the measured flow and presents a streamlined profile to the flow to minimize pressure losses. Alternatively, the entire measured flow may be passed through the flowmeter.

12 Claims, 5 Drawing Figures

U.S. Patent    Jan. 13, 1981    4,244,230
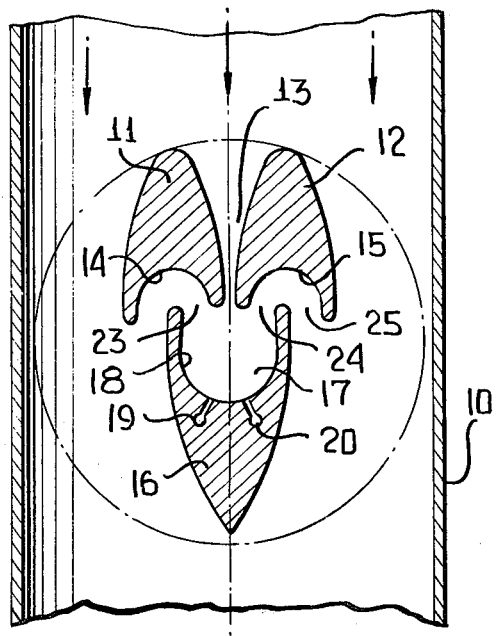
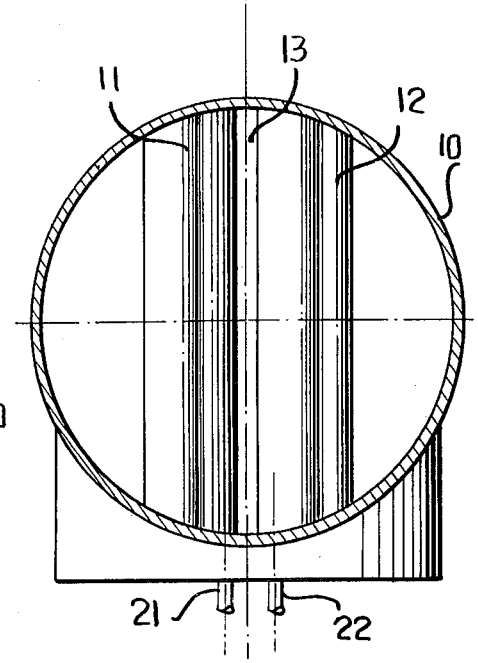
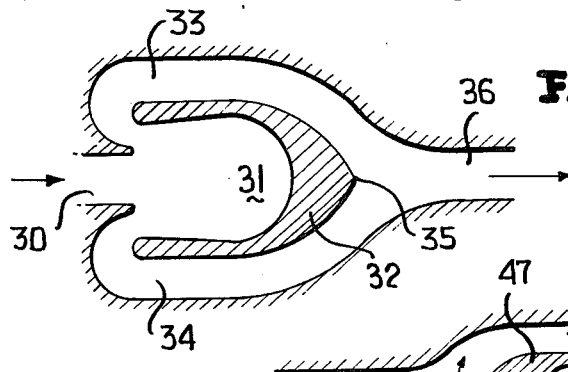
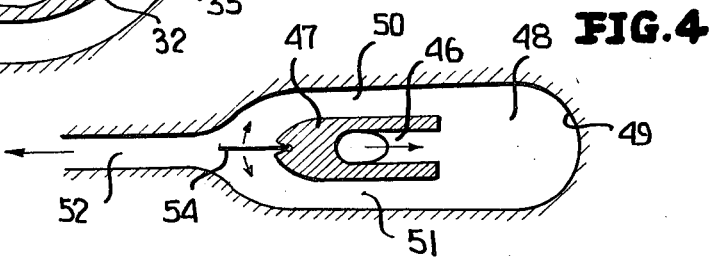
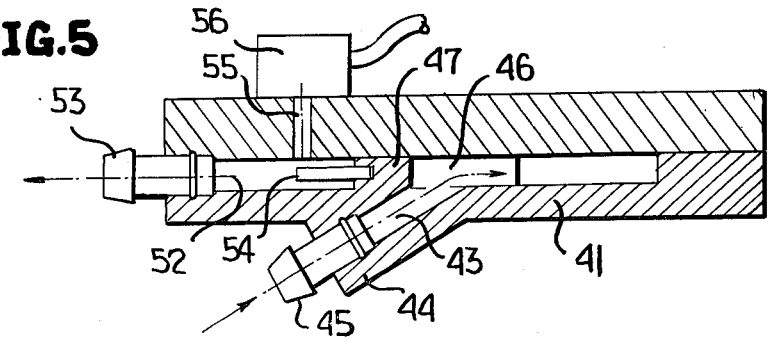

4,244,230

FLUIDIC OSCILLATOR FLOWMETER

CROSS REFERENCES TO RELATED PATENT APPLICATIONS

This application is a continuation-in-part of my co-pending U.S. patent application Ser. No. 859,145, filed Dec. 9, 1977, and entitled "FLUIDIC OSCILLATOR AND SPRAY-FORMING OUTPUT CHAMBER" now U.S. Pat. No. 4,184,686.

BACKGROUND OF THE INVENTION

The present invention relates to flowmeters of the type wherein a fluidic oscillator oscillates at a frequency which is proportional to volumetric flow.

The prior art includes a number of flow sensing devices based on oscillatory flow effects. These devices take the form of flowmeters generating a frequency signal which is, more or less, proportional to volumetric flow. Some of these devices have shown considerable success in general and special applications in the face of strong competition from well refined and long established conventional instruments due to inherent advantageous properties, such as those given by few or no moving parts and simplicity of construction, insensitivity to adverse environments and liquids, high accuracy, and low cost.

From the point of view of their operating mechanisms, these novel flowmeters fall between positive displacement meters and differential pressure devices. Not unlike turbine flowmeters, these sensors rely fundamentally on the quantization of flow into discrete volumes, albeit not isolated from each other as in positive displacement volumeters. Consequently, some advantages similar to those of turbine meters are offered, whilst disadvantages of moving parts are reduced or avoided. In general also, comparatively lower costs are characteristic of these devices.

Examples of these prior art flowmeters are found in U.S. Pat. No. 3,589,185 (Burgess) and 3,690,171 (Tippetts et al). In the Burgess flowmeter an obstruction is placed in a flow channel to shed a vortex street downstream of the obstruction. The frequency of the vortices is proportional to the flow through the channel and this frequency is transduced to an electrical or other signal to provide a measure of the flow. The Tippetts et al device employs a fluidic oscillator in which the flow is passed through a nozzle to form a jet which is caused to deflect in an oscillatory manner transversely of the jet flow direction. The oscillation frequency is proportional to the flow and is sensed acoustically.

The vortex-shedding approach of Burgess is very sensitive to noise and its operating range is curtailed by certain limiting flow criteria. The Tippett et al approach uses built-in fluidic amplification to increase the gain and minimize signal-to-noise problems; however, oscillation in the Tippetts et al device does not occur at low flow rates so that the device cannot be used to measure low flow rates. In addition, both Burgess and Tippets et al introduce flow impedance and attendent losses into the measured flow.

It is an object of the present invention to provide a low impedance fluidic oscillator flowmeter which is relatively insensitive to noise and which is useful at even extremely low flow rates.

SUMMARY OF THE INVENTION

In accordance with the present invention a flowmeter employs the fluidic oscillator described and illustrated in my co-pending U.S. Patent Application Ser. No. 859,145, filed Dec. 9, 1977. That oscillator has a substantially linear frequency versus flow characteristic. In addition, that oscillator oscillates at very low flow rates and includes a built-in amplification to enhance the signal to noise ratio.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 1 is a top view in section of a flowmeter embodiment according to the present invention installed in a pipe conducting flow to be measured;

FIG. 2 is an end view in plan of the embodiment of FIG. 1;

FIG. 3 is a partially schematic top view in section of another flowmeter embodiment according to the present invention;

FIG. 4 is a partially schematic top view in section of still another flowmeter embodiment according to the present invention; and FIG. 5 is side view in sections of the flowmeter embodiment of FIG. 4.

DESCRIPTION OF PREFERRED EMBODIMENTS

The flowmeter of the present invention employs the fluidic oscillator described in my aforesaid co-pending U.S. Patent Application Ser. No. 859,145, which patent application is expressly incorporated herein by reference. A first embodiment of the flowmeter is illustrated in FIGS. 1 and 2. Specifically a flow channel for conducting the metered flow is illustrated as a cylindrical pipe 10. It is to be understood that this channel can take any configuration, and may even be open along its top. Fluid flow in pipe 10 is represented by the arrows shown in FIG. 1. Two members 11 and 12 of semi-ovate cross-section are disposed transversely across pipe 10 with the major axes of the semi-oval parallel to the flow direction. Members 11 and 12 are slightly spaced apart to define a downstream tapering nozzle 13 therebetween. The downstream ends of members 11 and 12 are formed as downstream-facing cusps 14 and 15, respectively. A body member 16 has an oscillation chamber 17 defined therein to receive flow from nozzle 13. Chamber 17 is shown as U-shaped in FIG. 1, but capable of assuming any configuration consistent with the operational characteristics described for oscillator chambers in my aforementioned patent application Ser. No. 859,145. The oscillation chamber 17 is shown disposed symmetrically with respect to nozzle 13, but this is not a requirement. A pair of tiny pressure ports 19 and 20 are defined in the impingement wall 18 end of chamber 17; again, these ports are shown disposed symmetrically with respect to nozzle 13 but this is not a limiting feature of the invention. The pressure ports 19 and 20 communicate with tubes 21, 22 which extend out through pipe 10.

In operation, a portion of the flow in pipe 10 is directed into nozzle 13 which issues a jet into chamber 17.

Oscillation ensues in chamber 17 in the manner described in my aforementioned patent application Ser. No. 859,145. Specifically, upon receiving pressurized fluid, nozzle 13 directs a jet of the fluid into chamber 17. Upon impinging against the wall 18 of chamber 17, the jet divides into two oppositely directed flows which follow the contour of wall 18 and egress through output passages 23 and 24 on opposite sides of the input jet and nozzle 13. These two reversing flows form vortices on opposite sides of the inflowing jet. This condition is highly unstable due to the mutual influences of the flow patterns on one another. Assume that the vortex on the sides of outlet passage 24 tends to predominate initially. This vortex moves closer toward the center of chamber 17, directing more of the incoming fluid along its counter-clockwise flowing periphery and out of output passage 24. The weaker vortex, in the meantime, tends to be crowded toward output passage 23 and directs less of the input fluid in a clockwise direction out through passage 23. Eventually the stronger vortex is positioned substantially at the center of chamber 17 while the weaker vortex substantially blocks outlet passage 23. It is this condition during which the maximum outflow through passage 24 occurs. As the weaker vortex is forced closer and closer to output passage 23, two things occur: the weaker vortex pinches off outflow through output passage 23 and it also moves substantially closer to nozzle 13. In this condition the weaker vortex receives fluid flowing at a much higher velocity than the fluid received by the dominant stronger vortex. Therefore, as the weaker vortex moves closer to output passage 23 it begins spinning faster, in fact much faster than stronger vortex still located near the center of chamber 17. With output passage 23 blocked, the weaker vortex begins to strengthen and move back toward the center of chamber 17 and in so doing forces the now slower spinning vortex back away from the center. This tendency is increased by the fact that the jet itself is issued toward the center of the chamber 17 and, if left unaffected by other influences, would tend to flow toward that center. The formerly weaker vortex now becomes increasingly dominant and continues toward the center of the chamber 17. The formerly dominant vortex is eventually pushed to a position whereby it blocks outflow through output passage 24. During this condition the formerly weak vortex is centered in chamber 17 and substantially all of the outflow proceeds through output passage 23. The vortex blocking passage 24 is now in a position to receive the high velocity fluid from the inflowing jet so that this vortex begins spinning faster and faster, taking on a growing position of dominance between the two vortices and moving closer toward the center of chamber 17. The cycle is complete when the two vortices achieve substantially side-by-side positions on opposite sides of the incoming jet, whereupon once again equal flow egresses through output passages 23 and 24. The cycle then repeats continuously in the manner described at a frequency proportional to volumetric flow through the nozzle 13. Summarizing the afore-described operation, initial flow of the jet into chamber 17 produces a straight flow across the chamber which splits into two loops near the far chamber wall. Each split-off and reversed loop flow tends to form a vortex which exerts a force on the jet. The resulting unstable balance between the two vortices on either side of the flow cannot sustain the momentary initial condition since any minute asymmetry, causing a corresponding increase in one of the reverse flow loops, causes a decrease in reverse flow and force on the opposite side of the jet. This in turn begins to deflect the jet toward the side with the weaker reverse flow loop, which further enhances the action of the phenomenon. In other words, a positive feedback effect is present and it causes the flow exiting from the chamber to veer toward one side of the chamber until a new balance of vortices is reached. It must be recognized that the occurring phenomena are inherently of a transient dynamic nature such that any flow conditions are of a quasi-steady state nature wherein none of the existing flow patterns represents a stable state; that is, the flow state in any location is dependent upon its prior history due to the fact that local flow states influence and are influenced by those flow states in other locations only after a delay in time. Even though the stronger of the two existing vortices might appear capable of sustaining the illustrated flow pattern at any point, the quasi-steady state effect of the outflow into one or more of the output channels causes the pattern in the chamber to become more symmetrical. This in turn causes a diminution of reverse flow and, simultaneously, causes an increase in the reverse flow on the opposite side. Both effects become effective after a respective time delay. This time delay is additionally increased due to the fact that the rotational energy in the motion of the two vortices must dissipate before flow reversal can be effected. Thus for a brief period of time outflow through one output passage remains essentially constant (although its velocity may increase as its flow area is constricted) before diminishing and consequently its influence on the adjacent counterflow is also sustained for a similar period of time. The flow pattern becomes more symmetrical and the buildup of the opposite reverse loop flow causes outflow to the opposite output channel. The vortex loop effects in large part comprise inertance and compliance phenomena with energy storage mechanisms, all of which are essential to the oscillation function.

Alternating outflow pulses are first directed upstream when egressing from chamber 17 and are then redirected by cusps 14, 15 into the main channel flow. As the jet in chamber 17 is swept back and forth by the alternating vortices, the differential pressure at ports 19, 20 (and therefore at tubes 21, 22) varies at the frequency of oscillation. I have found that the frequency of oscillation for the oscillator of the present invention varies linearly with the flow therethrough. Consequently, by employing a conventional transducer, for example an electrical pressure transducer, it is possible to provide a measurement of flow through tube 10.

The flow metering arrangement of FIGS. 1 and 2 is highly advantageous as compared to prior art attempts to employ fluid oscillations as a flow measurement parameter. For example, only a small oscillator need be used, thereby minimizing any losses introduced by the oscillator. Further the channel flow which by-passes the oscillator (i.e. flow around the outside of members 11 and 12) serves to aspirate flow from the cusp regions 14, 15, thereby providing a differential pressure effect across the oscillator. Importantly, the negative aspiration pressure permits the by-pass flow to affect oscillator frequency and thereby permit more than just the limited flow through the nozzle 13 to be part of the measurement. Since flow velocity tends to vary somewhat across a channel, this use of a greater portion of the flow without increasing losses, is highly advantageous. It is to be understood that all of the flow can be directed through the oscillator, if desired, but that losses are minimized if only a small part of the flow is so directed.

The oscillation frequency can be sensed in many places. Pressure ports 19, 20 are particularly suitable because the dynamic pressure in the jet is available where these ports are shown, and that pressure is easily sensed. It is also possible to insert a hot wire anemometer or other flow transducing device 25 in one of the output passages of the oscillator to sense flow frequency.

An in-line flow sensor embodiment is illustrated in FIG. 3. Specifically, all of the flow through a pipe 30 or other flow channel is directed into oscillation chamber 31. Flow chamber 31 is in the form of a generally U-shaped recess in body member 32. The open end of U-shaped chamber 31 is wider than tube 30 so that outflow can proceed from the chamber on either side of the incoming flow. Oscillation ensues in chamber 31, in the manner described in relation to chamber 17 of FIG. 1, and alternating fluid pulses are directed out of the chamber at opposite sides of the incoming flow. The alternating pulses are received by outflow passages 33, 34, respectively, which turn 180° to redirect the oscillator outflow in the same general direction as the inflow in tube 30. Part of each of passage 33 and 34 is defined by body member 32 which has sides that converge to an apex 35 at the downstream end of the body member. As a consequence, passages 33 and 34 converge at apex 35 so that the fluid in each of these passages is joined in a common outflow channel 36. Frequency sensing and the required frequency to flow rate conversion can be accomplished by any of the numerous prior art techniques.

Still another embodiment of the present invention is illustrated in FIGS. 4 and 5. The flow sensor is made up of a top plate 40 and bottom plate 41 which may be of plastic, metal or any other material appropriate for the fluid environment. The oscillator is formed as recesses in the top surface of bottom plate 41 and is sealed by the top plate 40, the plates being secured to one another by adhesive material, screws, or any appropriate means. An inflow passage 43 for metered fluid is formed in a projection 44 extending down from bottom plate 41. A suitable fitting 45 is employed to permit inlet flow tubes to be readily connected to passage 43. Inlet passage 43 terminates at an inlet region 46 defined between the arms of a generally U-shaped member 47. U-shaped member, in point of fact, is a non-recessed portion of bottom plate 41 disposed in island-like position within a generally oval-shaped recess or chamber 48. Flow from inlet region 46 is directed to impinge against end wall 49 at one end of chamber 48 whereupon oscillation of the flow ensues in the manner described above in relation to chamber 17 of FIG. 1. Outflow from the oscillation is in the form of alternate fluid pulses directed on opposite sides of the inflow and received by passages 50, 51. These passages are defined between member 47 and opposite side walls of chamber 48 and converge toward a downstream apex of body 47. The combined outflows are directed into outflow passage 52 which is provided with a suitable fitting 53 to permit connection to an outflow tube. The flow sensor of FIGS. 4 and 5 can therefore be inserted into a flow path by simply inserting in the path with connections to inlet fitting 45 and outlet fitting 53.

Although the frequency in the apparatus of FIGS. 4 and 5 can be sensed by any conventional technique, a particularly useful technique is illustrated in those Figures. Specifically, a small, lightweight vane 54 is secured at one end to the downstream apex of body member 47 in such a manner that the vane extends downstream towards outflow passage 52. The vane is thus at the point of confluence of the alternating outflows in passages 50 and 51 and will tend to deflect as each alternate fluid pulse passes into passage 52. The frequency of deflection is the same as the frequency of oscillation and therefore is also proportioned to the flow through the flow sensor. A bore 55 is defined through upper plate 40 in alignment with the undeflected position of vane 54. Bore 55 is therefore in a position to serve as an optical path for sensing deflections in vane 54. A transducer 56 is disposed atop plate 40 for this purpose and serves to illuminate the vane 54 and sense reflections thereof as the vane passes back and forth in the chamber. By well known techniques these passes can be counted against a time base in transducer 56 of some other processing circuit and the result can be converted to a measure of flow. It should be noted that, since the vane passes bore 55 twice during each cycle of oscillation, the counted frequency is actually twice that of the actual oscillator frequency. This provides greater flow measurement resolution since half cycles of actual oscillator frequency correspond to a simple count. It would also be possible to have the vane 54 self-illuminated, whereby transducer 56 would contain no illumination source. In addition, the vane may be sensed at two or more locations in the sweep path, rather than at the center, to further enhance resolution.

Other types of conventional frequency sensing approaches may likewise be employed. For example, these include hot wire anemometers or thermistors positioned to sense the frequency of flow changes. A magnetic vane, similar to vane 54, could be sensed magnetically. Conductive fluid might be used and the frequency sensed electromagnetically. In addition, sensing may be done by means of Hall effect, capacitive sensing, ultrasonic sensing, strain gauge sensing, electroconductive surface contacts in open channel flows, etc.

Although flow sensing is described hereinabove in terms of liquid flow, it is so be understood that the principles of the present invention are equally applicable to gaseous flow sensing.

It should be noted that although plates 40, 41 are referred to as "top" and "bottom", respectively, these terms are for ease in reference only and in actual use the device can have any orientation.

While I have described and illustrated one specific embodiment of my invention, it will be clear that variations of the details of construction which are specifically illustrated and described may be resorted to without departing from the true spirit and scope of the invention as defined in the appended claims.

I claim:
1. A flow sensor for measuring fluid flow comprising:
   means for issuing a defined stream made up of at least part of said fluid flow;
   an oscillation chamber having a common inlet and outlet opening, said oscillation chamber being positioned to receive said defined stream through said common opening, said oscillation chamber including:
   oscillation means for cyclically oscillating said stream back and forth across said chamber in a direction substantially transverse to the direction of flow in said jet;

flow directing means for directing fluid from the cyclically oscillated stream out of said chamber through said common inlet and outlet opening; and sensing means for sensing the cyclic variation of the oscillating stream.

2. The flow sensor according to claim 1 wherein said oscillation means comprises impingement means, disposed in said oscillation chamber in the path of said jet, for forming, on each side of said jet, vortices of said jet fluid which alternate in both strength and chamber position in phase opposition.

3. The flow sensor according to claim 2 wherein said impingement means comprises a far wall of said chamber remote from said common inlet and outlet opening, and wherein said flow directing means comprises said far wall and opposing sidewalls of said chamber.

4. The flow sensor according to claim 3 wherein said means for issuing is positioned to issue said stream generally radially across said oscillation chamber toward said far wall, and wherein said common inlet and outlet opening is defined as a space between said opposing sidewalls.

5. The flow sensor according to claim 4 further comprising:

a first outlet passage positioned at one side of said defined stream to receive fluid flowing out of said common inlet and outlet opening along said one side; and a second outlet passage positioned at the opposite side of said defined stream to receive fluid flowing out of said common inlet and outlet opening along said opposite side.

6. The flow sensor according to claim 5 wherein said first and second outlet passages converge to form a common outlet passage.

7. The flow sensor according to claim 5 wherein said sensing means comprises a pair of pressure ports defined in said chamber, said pressure ports being symmetrically positioned with respect to said defined stream when undeflected.

8. The flow sensor according to claim 5 wherein said sensing means comprises means for measuring cyclic flow variation in at least one of said outlet passages.

9. The oscillator according to claim 5 wherein said first and second outlet passages are directed to issue received fluid in the same flow direction as said fluid flow.

10. The oscillator according to claim 9 wherein said means for issuing has an inlet end which is streamlined and positioned to face directly upstream in said fluid flow, and wherein said outlet passages are positioned to be aspirated by said fluid flow.

11. The flow sensor according to claim 6 wherein said sensing means comprises:

vibratable means positioned in said flow sensor to vibrate at the frequency of oscillation of said stream;

detector means for counting vibrations of said vibratable means.

12. The flow sensor according to claim 11 wherein said detector means includes:

means for illuminating said vibratable means; and means for optically sensing vibrations of said illuminated vibratable means.

* * * * *